(12) United States Patent
Chan et al.

(10) Patent No.: US 10,599,479 B2
(45) Date of Patent: Mar. 24, 2020

(54) RESOURCE SHARING MANAGEMENT OF A FIELD PROGRAMMABLE DEVICE

(71) Applicant: INTERNATIONAL BUSINESS MACHINES CORPORATION, Armonk, NY (US)

(72) Inventors: Yuk L. Chan, Rochester, NY (US); Andrew P. Wack, Millbrook, NY (US); Peter B. Yocom, LaGrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 339 days.

(21) Appl. No.: 15/271,780

(22) Filed: Sep. 21, 2016

(65) Prior Publication Data

US 2018/0081724 A1    Mar. 22, 2018

(51) Int. Cl.
*G06F 9/50* (2006.01)
*G06F 9/48* (2006.01)
*G06F 9/455* (2018.01)

(52) U.S. Cl.
CPC .......... *G06F 9/505* (2013.01); *G06F 9/45558* (2013.01); *G06F 9/4881* (2013.01); *G06F 9/5077* (2013.01); *G06F 2009/4557* (2013.01)

(58) Field of Classification Search
CPC .... G06F 9/505; G06F 9/45558; G06F 9/4881; G06F 9/5077; G06F 2009/4557
See application file for complete search history.

(56) References Cited

U.S. PATENT DOCUMENTS

| | | | |
|---|---|---|---|
| 5,473,773 A | 12/1995 | Aman et al. | |
| 5,530,862 A | 6/1996 | Wadsworth et al. | |
| 5,742,180 A | 4/1998 | Dehon et al. | |
| 5,752,035 A | 5/1998 | Trimberger | |

(Continued)

FOREIGN PATENT DOCUMENTS

| CN | 101826025 A | 9/2010 |
|---|---|---|
| CN | 103885771 A | 6/2014 |

(Continued)

OTHER PUBLICATIONS

List of IBM Patents or Patent Applications Treated as Related; Date File: Oct. 12, 2016, p. 1-2.

(Continued)

*Primary Examiner* — Jacob D Dascomb
(74) *Attorney, Agent, or Firm* — Cantor Colburn LLP; William Kinnaman

(57) ABSTRACT

Examples of techniques for resource sharing management of a field programmable device are disclosed. In one example implementation according to aspects of the present disclosure, a computer-implemented method may include: selecting a job belonging to one of a plurality of tenants based on resource control; dispatching a job to the field programmable device, wherein the job is received at a processing device, and wherein the job comprises dispatchable units; performing, by the field programmable device, the dispatchable units belonging to the job; and tracking, by the processing device, processing statistics related to each of the plurality of virtual processing devices based on performing the dispatchable units belong to the job.

20 Claims, 6 Drawing Sheets

(56) References Cited

U.S. PATENT DOCUMENTS

| | | |
|---|---|---|
| 6,369,610 B1 | 4/2002 | Cheung et al. |
| 6,442,732 B1 | 8/2002 | Abramovici et al. |
| 6,525,560 B1 | 2/2003 | Trimberger et al. |
| 6,604,230 B1 | 8/2003 | Khalid et al. |
| 6,867,614 B1 | 3/2005 | Le Graverand et al. |
| 7,080,146 B2 | 7/2006 | Bradford et al. |
| 7,146,598 B2 | 12/2006 | Horanzy |
| 7,272,081 B2 | 9/2007 | Goodman et al. |
| 7,299,203 B1 | 11/2007 | Nelson |
| 7,389,435 B2 | 6/2008 | Barr et al. |
| 7,496,539 B1 | 2/2009 | Bai et al. |
| 7,644,137 B2 | 1/2010 | Bozak et al. |
| 7,646,725 B1 | 1/2010 | Soukup et al. |
| 7,788,040 B2 | 8/2010 | Haskell et al. |
| 7,902,866 B1 | 3/2011 | Patterson et al. |
| 7,996,346 B2 | 8/2011 | Bell, Jr. et al. |
| 8,015,395 B1 | 9/2011 | Lewis et al. |
| 8,081,079 B1 | 12/2011 | Camarota |
| 8,181,175 B1 | 5/2012 | McKee et al. |
| 8,305,903 B1 | 11/2012 | Louise et al. |
| 8,645,529 B2 | 2/2014 | Doddavula |
| 8,654,637 B2 | 2/2014 | Scaglione |
| 9,032,344 B2 | 5/2015 | Chene |
| 9,032,399 B1 | 5/2015 | Yang et al. |
| 9,270,624 B2 | 2/2016 | Zhuang et al. |
| 9,292,336 B1 | 3/2016 | Ramalingam et al. |
| 9,348,724 B2 | 5/2016 | Ota et al. |
| 9,356,883 B1 | 5/2016 | Borthakur |
| 9,367,379 B1 | 6/2016 | Burke et al. |
| 9,465,630 B1* | 10/2016 | Muniz ................ G06F 9/455 |
| 9,563,446 B2 | 2/2017 | Sandlin et al. |
| 9,614,972 B2 | 4/2017 | Ballai et al. |
| 9,685,956 B1 | 6/2017 | Chan et al. |
| 9,864,636 B1 | 1/2018 | Patel et al. |
| 9,973,193 B2 | 5/2018 | Chan |
| 10,021,008 B1 | 7/2018 | Pai et al. |
| 10,248,466 B2 | 4/2019 | Chan |
| 2002/0038340 A1 | 3/2002 | Whipple et al. |
| 2002/0080784 A1 | 6/2002 | Krumel |
| 2003/0086300 A1 | 5/2003 | Noyes et al. |
| 2004/0111248 A1 | 6/2004 | Granny et al. |
| 2004/0141386 A1 | 7/2004 | Karlsson |
| 2004/0243692 A1 | 12/2004 | Arnold et al. |
| 2005/0097305 A1 | 5/2005 | Doering et al. |
| 2005/0216585 A1 | 9/2005 | Todorova et al. |
| 2005/0216860 A1 | 9/2005 | Petrov et al. |
| 2005/0259484 A1 | 11/2005 | Newell |
| 2007/0074045 A1 | 3/2007 | Van Essen et al. |
| 2008/0028186 A1 | 1/2008 | Casselman |
| 2008/0082983 A1 | 4/2008 | Groetzner et al. |
| 2008/0270199 A1 | 10/2008 | Chess et al. |
| 2009/0063709 A1 | 3/2009 | Rice et al. |
| 2009/0228224 A1 | 9/2009 | Spanier et al. |
| 2009/0300608 A1* | 12/2009 | Ferris ................ G06F 9/45558 718/1 |
| 2010/0042450 A1 | 2/2010 | Binswanger et al. |
| 2010/0070260 A1 | 3/2010 | Mori |
| 2010/0180275 A1 | 7/2010 | Neogi et al. |
| 2011/0153507 A1 | 6/2011 | Murthy et al. |
| 2011/0161972 A1 | 6/2011 | Dillenberger et al. |
| 2011/0196907 A1 | 8/2011 | Kusmanoff et al. |
| 2011/0231644 A1 | 9/2011 | Ishebabi |
| 2011/0258634 A1 | 10/2011 | Bonilla et al. |
| 2012/0096093 A1 | 4/2012 | Bouw et al. |
| 2012/0324417 A1 | 12/2012 | Somani et al. |
| 2013/0007759 A1 | 1/2013 | Krishnamurthy et al. |
| 2013/0031553 A1 | 1/2013 | Hou et al. |
| 2013/0061033 A1 | 3/2013 | Kim et al. |
| 2013/0179894 A1* | 7/2013 | Calder ................ G06F 9/5027 718/104 |
| 2013/0226764 A1 | 8/2013 | Battyani |
| 2013/0232328 A1 | 9/2013 | Johnson |
| 2013/0311738 A1 | 11/2013 | Jiang et al. |
| 2013/0346979 A1 | 12/2013 | Nightingale et al. |
| 2014/0074641 A1 | 3/2014 | Wang |
| 2014/0137104 A1 | 5/2014 | Nelson et al. |
| 2014/0137107 A1 | 5/2014 | Banerjee et al. |
| 2014/0215424 A1 | 7/2014 | Fine et al. |
| 2014/0244841 A1* | 8/2014 | Gulati ................ G06F 9/5072 709/226 |
| 2014/0258535 A1 | 9/2014 | Zhang |
| 2014/0279985 A1 | 9/2014 | Fontenot et al. |
| 2014/0285853 A1 | 9/2014 | Zhang |
| 2014/0317265 A1 | 10/2014 | James et al. |
| 2014/0351811 A1 | 11/2014 | Kruglick |
| 2014/0359113 A1 | 12/2014 | Krebs et al. |
| 2015/0032817 A1 | 1/2015 | Garg et al. |
| 2015/0040112 A1 | 2/2015 | Valencia |
| 2015/0058863 A1 | 2/2015 | Karamanolis et al. |
| 2015/0067220 A1 | 3/2015 | Schwach et al. |
| 2015/0100971 A1 | 4/2015 | Dube et al. |
| 2015/0113268 A1 | 4/2015 | Wu |
| 2015/0123706 A1 | 5/2015 | Cong et al. |
| 2015/0146675 A1 | 5/2015 | Zhang et al. |
| 2015/0205714 A1 | 7/2015 | Greenfield et al. |
| 2015/0281018 A1 | 10/2015 | Britt et al. |
| 2015/0296002 A1 | 10/2015 | Pell |
| 2015/0309789 A1 | 10/2015 | Thorat |
| 2015/0363133 A1 | 12/2015 | Bobroff et al. |
| 2016/0036886 A1 | 2/2016 | Ito |
| 2016/0048391 A1 | 2/2016 | Somani et al. |
| 2016/0154681 A1 | 6/2016 | Chen et al. |
| 2016/0171611 A1 | 6/2016 | Sheng et al. |
| 2016/0191343 A1 | 6/2016 | Dong et al. |
| 2016/0232502 A1 | 8/2016 | Barbulescu et al. |
| 2016/0314025 A1 | 10/2016 | McGarry et al. |
| 2016/0321113 A1* | 11/2016 | Pinto ................ G06F 9/45533 |
| 2016/0323161 A1 | 11/2016 | Cuervo Laffaye et al. |
| 2016/0328230 A1 | 11/2016 | Schneider et al. |
| 2016/0335120 A1 | 11/2016 | Gupta et al. |
| 2016/0350529 A1 | 12/2016 | Kerr et al. |
| 2017/0039050 A1 | 2/2017 | Eltsin et al. |
| 2017/0060653 A1 | 3/2017 | Nandakumar et al. |
| 2017/0083386 A1 | 3/2017 | Wing et al. |
| 2017/0083703 A1 | 3/2017 | Abbasi et al. |
| 2017/0090987 A1 | 3/2017 | Hearn et al. |
| 2017/0097851 A1 | 4/2017 | Chen |
| 2017/0286142 A1 | 10/2017 | Palermo et al. |
| 2017/0353397 A1 | 12/2017 | Che |
| 2018/0011801 A1* | 1/2018 | Sengupta ................ G06F 3/0622 |
| 2018/0040096 A1 | 2/2018 | Benthin et al. |
| 2018/0083632 A1 | 3/2018 | Chan et al. |
| 2018/0159746 A1 | 6/2018 | Li et al. |

FOREIGN PATENT DOCUMENTS

| | | |
|---|---|---|
| CN | 104881666 A | 9/2015 |
| EP | 1093051 A2 | 4/2001 |
| WO | 03039052 A2 | 5/2003 |

OTHER PUBLICATIONS

Yuk L. Chan, et al., "Managing Workload Distribution Among Processing Systems Based on Field Programmable Devices" U.S. Appl. No. 15/271,753, filed Sep. 21, 2016.

Yuk L. Chan, et al.,"Deploying and Utilizing a Software Library and Corresponding Field Programmable Device Binary", U.S. Appl. No. 15/271,789, filed Sep. 21, 2016.

Yuk L. Chan, et al.,"Deploying and Utilizing a Software Library and Corresponding Field Programmable Device Binary", U.S. Appl. No. 15/271,742, filed Sep. 21, 2016.

Yuk L. Chan, et al.,"Enabling a Field Programmable Device On-Demand", U.S. Appl. No. 15/271,720, filed Sep. 21, 2016.

Yuk L. Chan, et al.,"Reprogramming a Field Programmable Device On-Demand", U.S. Appl. No. 15/271,728, filed Sep. 21, 2016.

Yuk L. Chan, et al.,"Service Level Management of a Workload Defined Environment" U.S. Appl. No. 15/271,770, filed Sep. 21, 2016.

Yuk L. Chan, et al.,"Service Level Management of a Workload Defined Environment", U.S. Appl. No. 15/271,760, filed Sep. 21, 2016.

(56) References Cited

OTHER PUBLICATIONS

"IT Services Management A Description of Service Level Agreements" White Paper, RL Consulting, May 25, 2002, p. 1-9.
Mitesh Soni, "Cloud computing and Chargeback Models" Cloudbook, Journal vol. 3, issue 1, 2012, p. 1-16.
List of IBM Patents or Patent Applications Treated as Related; Date Filed: Apr. 24, 2017, p. 1-2.
"Microsoft Computer Dictionary"; Container; 5th Edition; 2002; p. 125.
Arnold et al.; "Workload Orchestration and Optimization for Software Defined Dnvironments"; IBM J. Res. & Dev.; vol. 58 No. 2/3; Mar./May 2014; 12 Pages.
Chan, Yuk L. et al., "Reprogramming a Field Programmable Device On-Demandt" U.S. Appl. No. 16/420,211, filed May 23, 2019.
Chan, Yuk L. et al., "Service Level Management of a Workload Defined Environment" U.S. Appl. No. 16/420,210, filed May 23, 2019.
Dalton et al.; "Raksha: A Flexible Information Flow Architecture for Software Security"; ISCA'07; Jun. 9-13, 2007; pp. 482-493.
Dayal et al.; "I/O Containers: Managing the Data Analytics and Visualization Pipelines of High End Codes"; IEEE 27th International Symposium on Parallel & Distributed Processing Workshops and PhD Forum; 2013; 10 Pages.
Garcia et al.; "SLA-Driven Dynamic Cloud Resource Management"; Future Generation Computer Systems; vol. 31; 2014; pp. 1-11.
Kindratenko et al.; "Dynamic Load-Balancing on Multi-FPGA Systems: A Case Study"; Retrieved online from http://www.ncsa.illinois.edu/.; Jun. 26, 2007; pp. 1-8.
Kornecki et al.; "Hardware Certification for Real-Time Safety-Critical Systems: State of the Art"; Art Reviews in Control; vol. 34, No. 1; 2010; pp. 163-174.
Kuznetsov et al.; "Testing Closed-Source Binary Device Drivers with DDT"; 2010; Retrieved Online from http://static.usenix.org/events/atc/tech/full_papers/Kuznetsov/pdf on Nov. 20, 2017; 14 Pages.
Lin et al.; "OpenRCL: Low-Power High-Performance Computing with Reconfigurable Devices"; International Conference on Filed Programmable Logic and Applications; 2010; 6 Pages.
List of IBM Patents or Patent Applications Treated as Related; Date Filed: Jun. 4, 2019; 2 Pages.
Tosatto et al.; "Container-Based Orchestration in Cloud: State of the Art and Challenges"; 2015 Ninth International Conference on Complex, Intelligent, and Software Intensive Systems; 2015; pp. 70-75.
Tsoi et al.; "Power Profiling and Optimization for Heterogeneous Multi-Core System"; Department of Computing; Imperial College London; Aug. 29, 2011; 6 Pages.

\* cited by examiner

RESOURCE SHARING MANAGEMENT OF A FIELD PROGRAMMABLE DEVICE

BACKGROUND

The present application generally relates to field programmable devices and, more particularly, to resource sharing management of a field programmable device, such as in a multi-tenant environment.

Special purpose processing units are gaining popularity due to their high performance. In some situations, hardware manufacturers have begun adding field-programmable device-based special purpose processing units to computing systems to improve performance and cost to run a special workload. A field-programmable device (FPD) such as a field programmable gate array (FPGA), a programmable read-only memory (PROM), or a programmable logic device (PLD) provides more flexible compared to traditional integrated circuit manufacturing by allowing updating of functionality after shipping the computing system (i.e., while the computing system is in the field). An FPD can be used in a multi-tenant environment so that multiple tenants can share the FPD's resources.

SUMMARY

According to examples of the present disclosure, techniques including methods, systems, and/or computer program products for resource sharing management of a field programmable device are provided. An example method may include: selecting a job belonging to one of a plurality of tenants based on resource control; dispatching a job to the field programmable device, wherein the job is received at a processing device, and wherein the job comprises dispatchable units; performing, by the field programmable device, the dispatchable units belonging to the job; and tracking, by the processing device, processing statistics related to each of the plurality of virtual processing devices based on performing the dispatchable units belong to the job.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Although an FPD can be used in a multi-tenant environment for FPD resource sharing, current approaches do not provide for any monitoring capability that can track usage of the FPD by different tenants. In particular, it may be desirable to track FPD usage on a per-tenant basis, so that costs associated with such usage may be charged back to the appropriate tenant.

In some implementations, the present techniques provide improved functioning of the computing system by enabling system resources (i.e., FPD resources) to be tracked and used according to service level agreements. Additionally, the present techniques reduce system resource demands on the general processor of the computing system by enabling FPDs to perform specialized tasks (e.g., encoding/decoding of data, data encryption, data analytics, etc.). The present techniques also provide the ability to monitor and track the time that an FPD is utilized so that a user may be billed for the time. In addition, the present techniques enable increased system performance by enabling FPDs to be updated to perform different specialized tasks, thereby reducing the resource demands on the computing system's native resources (i.e., memory, general processor, etc.). These and other advantages will be apparent from the description that follows.

Figure 1A:
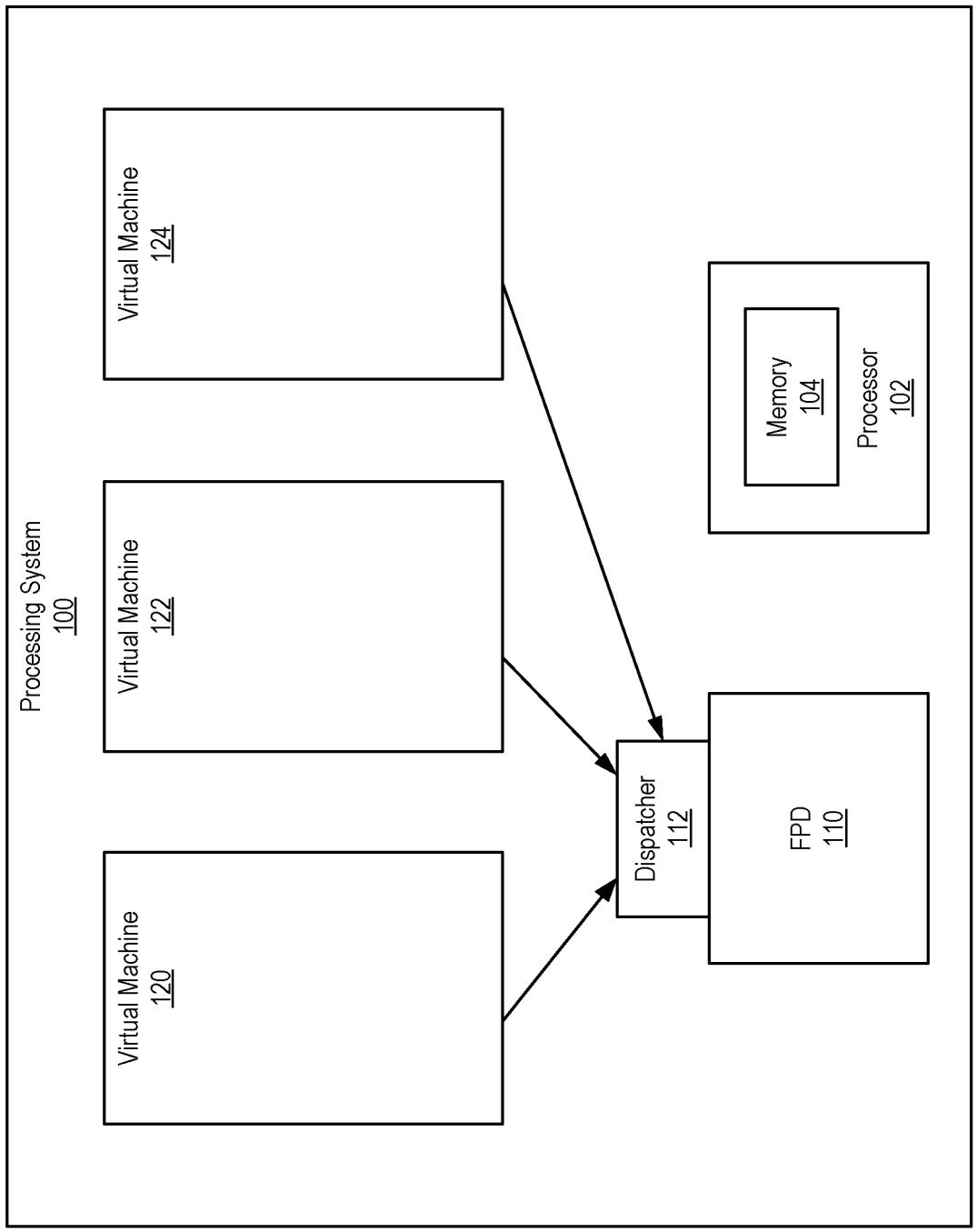
FIGS. 1A and 1B illustrate a block diagram of a processing system for resource sharing management of a field programmable device according to examples of the present disclosure.

FIG. 1A illustrates a block diagram of a processing system 100 for resource sharing management of a field programmable device 110 according to examples of the present disclosure. The processing system 100 includes a processor 102 that may be a general purpose processor and a memory 104 associated with the processor 102. The processor 102 is responsible for executing computer readable instructions stored in the memory 104. For example, the processor 102 may execute an operating system and one or more applications running within the operating system.

In some situations, specialized tasks may be offloaded onto a field programmable device such as FPD 110. The FPD 110 may execute computer readable instructions to perform a specialized task, such as encoding/decoding of data, data encryption, data analytics, or other tasks that are suitable for execution on a field programmable device. By offloading these specialized tasks to field programmable devices, the processing system 100 and its processor 102 is free to perform other tasks. It should be appreciated that the FPD 110 may be a field programmable gate array (FPGA), a programmable read-only memory (PROM), a programmable logic device (PLD), or another suitable field programmable device. Additionally, the FPD 110 includes a binary programmed into the FPD 110 that indicates a number of clock cycles for a run. From that, it may be determined a number of runs capable per time period, such as 5,000 runs per millisecond (run/ms), 2,000 run/ms, 7,200 run/ms, or another suitable number of runs per time period.

Figure 1B:
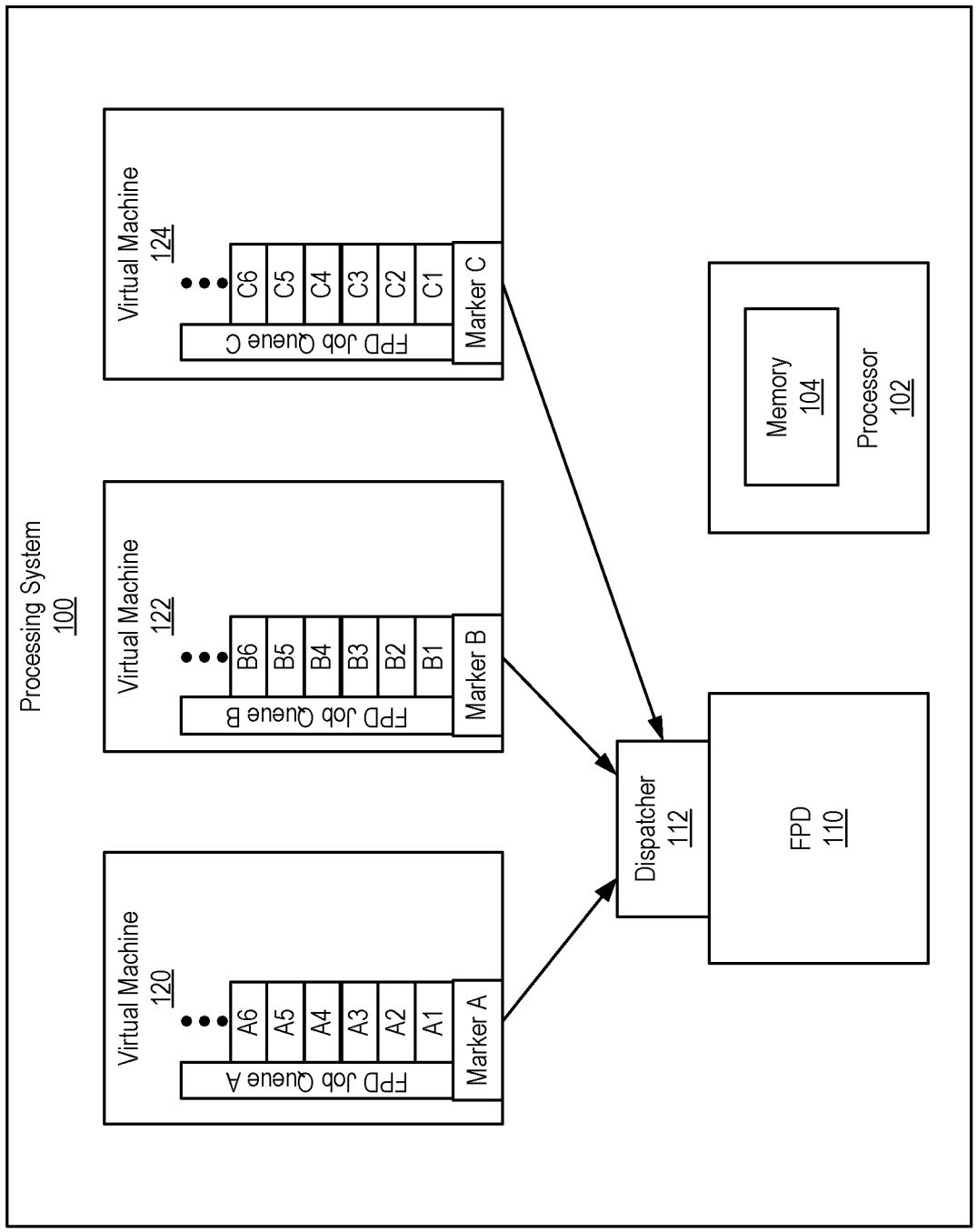

As illustrated, the processing system 100 may include multiple virtual machines, such as virtual machines 120, 122, 124, which emulate a processing system executing on the processing system 100. Each of the virtual machines 120, 122, 124 may utilize resources of the FPD 110 by sending tasks to the FPD 110 via a dispatcher 112. In this way, each of the virtual machine 120, 122, 124 represent tenants in a multi-tenant environment. Resource control can apply to the FPD, where the utilization of the FPD for each tenant is controlled. For example, a certain percentage of the FPD 110 may be apportioned to each of the virtual machines 120, 122, 124. The apportionment may be based on a service level agreement (SLA). In the example of FIG. 1B, an SLA may define the virtual machine 120 as having a 50% share of the FPD 110, the virtual machine 122 as having a 20% share of the FPD 110, and the virtual machine 124 as having a 10% share of the FPD 110. The remaining resource allocation of the FPD 110 may be reserved for future use or may be apportioned to additional virtual machines (not shown).

In another example, the resource control can be set proportional to the number of general processors assigned to the virtual machine. For example, virtual machine 120 includes two general purpose processors assigned to it, virtual machine 122 includes three general purpose processors assigned to it, and virtual machine 124 includes five general purpose processors assigned to it. The FPD can be assigned to the virtual machine proportionally as follows: 2 out of 10 cycles of the FPD are assigned to virtual machine 120, 3 out of 10 cycles of the FPD are assigned to virtual machine 122, 5 out of 10 cycles of the FPD are assigned to virtual machine 124. In this case, resource control for the FPD is based on criteria outside of the service level agreement.

The dispatcher 112 retrieves jobs from job queues on the virtual machines 120, 122, 124 and dispatches the tasks to the FPD 110. In some examples, it should be appreciated that additional FPDs may be utilized, and the dispatcher 112 may dispatch tasks to the additional FPDs.

In particular and as illustrated in FIG. 1B, the dispatcher 112 retrieves jobs from the FPD job queues of each of the virtual machines 120, 122, 124. In the example of FIG. 1B, the virtual machine 120 includes FPD job queue A, the virtual machine 122 includes FPD job queue B, and the virtual machine 124 includes FPD job queue C. The FPD job queue A of the virtual machine 120 includes jobs A1, A2, A3, A4, A5, and A6. The FPD job queue B of the virtual machine 122 includes jobs B1, B2, B3, B4, B5, and B6. The FPD job queue C of the virtual machine 124 includes jobs C1, C2, C3, C4, C5, and C6.

In an example, it is assumed that each job takes the same number of clock cycles to run. Based on the SLA apportionment and the job queues, a dispatching sequence of jobs from the dispatcher 112 to the FPD 110 may be as follows for a 10 cycle chunk: A1, B1, A2, C1, A3, B2, A4, A5, idle, idle. The idle cycles represent cycles of the FPD 110 that are not apportioned to one of the virtual machines 120, 122, 124 since only 80% of the FPD 110 is apportioned to the virtual machines 120, 122, 124 based on the example SLA described above. A next dispatching sequence of jobs from the dispatcher 112 to the FPD 110 may be as follows for a 10 cycle chunk: A6, B3, A7, C2, A8, B4, A9, A10, idle, idle.

In an example, based on the SLA apportionment and the job queues, a dispatching sequence of jobs from the dispatcher 112 to the FPD 110 may be as follows for a 20 cycle chunk, and process 2 jobs from a queue consecutively: A1, A2, B1, B2, A3, A4, C1, C2, A4, A5, B3, B4, A6, A7, idle, idle, idle, idle. This implementation could be because of the cost of switching from one queue to another queue is computationally expensive.

In an example, there can be one job queue for each FPD type for each tenant. For example, there can be two FPD types on a processing system: FPD type A is responsible for encryption, another FPD type B is responsible for data compression. There may also be two physical FPDs performing logic for FPD Type A, and there may be one queue for each tenant for FPD Type A. Additionally, there may be one physical FPDs performing logic for FPD Type B, and there is one queue for each tenant for FPD Type B.

In an example, there can be multiple job queues for each FPD type for each tenant. Following from the above example, there are two physical FPDs performing logic for FPD Type A, where FPD X performing at 1000 cycles/ms, and FPD Y performing at 5000 cycles/ms. There are two queues for each tenant for each FPD. The SLA could specify the performance requirement for each tenant. For example, virtual machine A will process 30% of jobs in FPD X, and 70% of jobs in FPD Y.

In another embodiment, the FPD can be apportioned by weight. For example, an SLA may define the virtual machine 120 as having a weight of five for the share of the FPD 110, the virtual machine 122 as a weight of two for the share of the FPD 110, and the virtual machine 124 as having a weight of 10 of the FPD 110.

In another embodiment, the processing system 100 may include one or more applications responsible to process transactions. These transactions might belong to different tenants, identified by an identifier come with the transaction. Each tenant with different identifiers has a job queue of its own. A certain percentage of the FPD 110 may be apportioned to each of the tenants similar to the virtual machine example. The apportionment may be based on a service level agreement (SLA).

In an example, the application can be implemented in firmware, specialized in routing the incoming transaction to the appropriate job queue, manages the creation and deletion of job queues, and track FPD utilization for each job queue. In another example, the applications can be software applications running on an operating system. Multiple applications can add jobs to a common job queue that belongs to a tenant.

In another example, the applications can be software applications running on an operating system. The application can add jobs to a job queue for the application that belongs to a tenant. The SLA can specify a certain percentage of the FPD for each application, a certain percentage of the FPD for each tenant, or a combination of application percentage of the FPD and tenant percentage of the FPD.

When the percentage of the FPD is specified for each application, there can be a queue for each tenant in this application. The dispatcher can retrieve the job from each queue belongs to the same application using round robin algorithm. Additionally, the dispatcher can process jobs from application A based on the apportioned percentage for application A. The separate queues for each tenant in an application are used to ensure jobs from a tenant are not over utilized by other tenants, and to track the FPD performance and utilization for each tenant.

When the percentage of the FPD is specified for each application and for each tenant, there are queues for each tenant in the application. The dispatcher can retrieve the job from each queue belonging to the same application based on the apportioned tenant percentage. Additionally, the dispatcher can process jobs from application A based on the apportioned percentage for application A.

Figure 2:
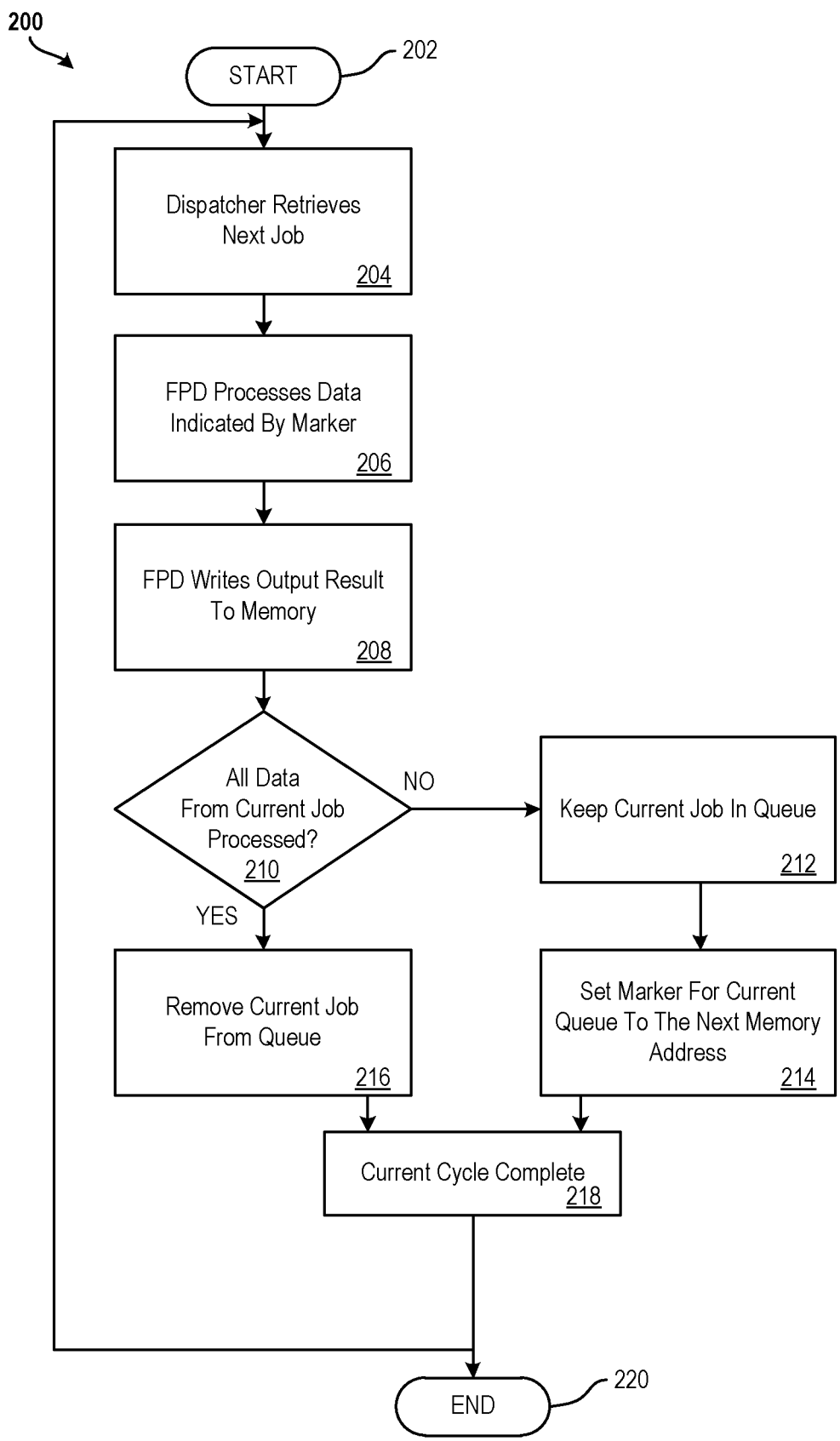
FIG. 2 illustrates a flow diagram of a method for resource sharing management of a field programmable device according to examples of the present disclosure.

In an example in which jobs on the queue utilize different numbers of cycles to run, the dispatcher 112 retrieves jobs from the FPD job queues using a number of the FPD assigned in the SLA as the frequency. FIG. 2 illustrates a flow diagram of a method 200 for resource sharing management of a field programmable device according to aspects of the present disclosure. In particular, FIG. 2 relates to dispatching jobs on the queue that utilize different numbers of cycles to run. For example, the FPD can be responsible for compression, and it is capable to process 1024 bits per cycle. If job A and job B are in the queue, job A has 4096 bits and utilizes four cycles to run, and job B has 2048 bits and utilizes two cycles to run.

In an embodiment, a job might be broken into dispatchable units. A dispatchable unit is a part of a job that can be processed by a FPD at a time. In an example similar to above, job A can be broken into four dispatchable units. Each dispatchable unit is processed by the FPD at a time.

In an example, an SLA may define the virtual machine 120 as having a 50% share of the FPD 110, the virtual machine 122 as having a 20% share of the FPD 110, and the virtual machine 124 as having a 10% share of the FPD 110. The remaining resource allocation of the FPD 110 may be reserved for future use or may be apportioned to additional virtual machines (not shown). It is assumed that each job takes different number of clock cycles to run. In such cases, Job A1, Job C1, and Job A3 utilize two cycles to process, while Job A2, Job B1, and Job B2, utilize one cycle to process. Based on the SLA apportionment and the job queues, a dispatching sequence of jobs from the dispatcher 112 to the FPD 110 may be as follows for a ten cycle chunk: A1 (dispatchable unit 1), B1, A1 (dispatchable unit 2), C1 (dispatchable unit 1), A2, B2, A3 (dispatchable unit 1), A3 (dispatchable unit 2), idle, idle. The idle cycles represent cycles of the FPD 110 that are not apportioned to one of the virtual machines 120, 122, 124 since only 80% of the FPD 110 is apportioned to the virtual machines 120, 122, 124 based on the example SLA described above. A next dispatching sequence of jobs from the dispatcher 112 to the FPD 110 may be as follows for a ten cycle chunk: A4, B3, A5, C1 (dispatchable unit 2), A6, B4, A7, A8, idle, idle.

Figure 5:
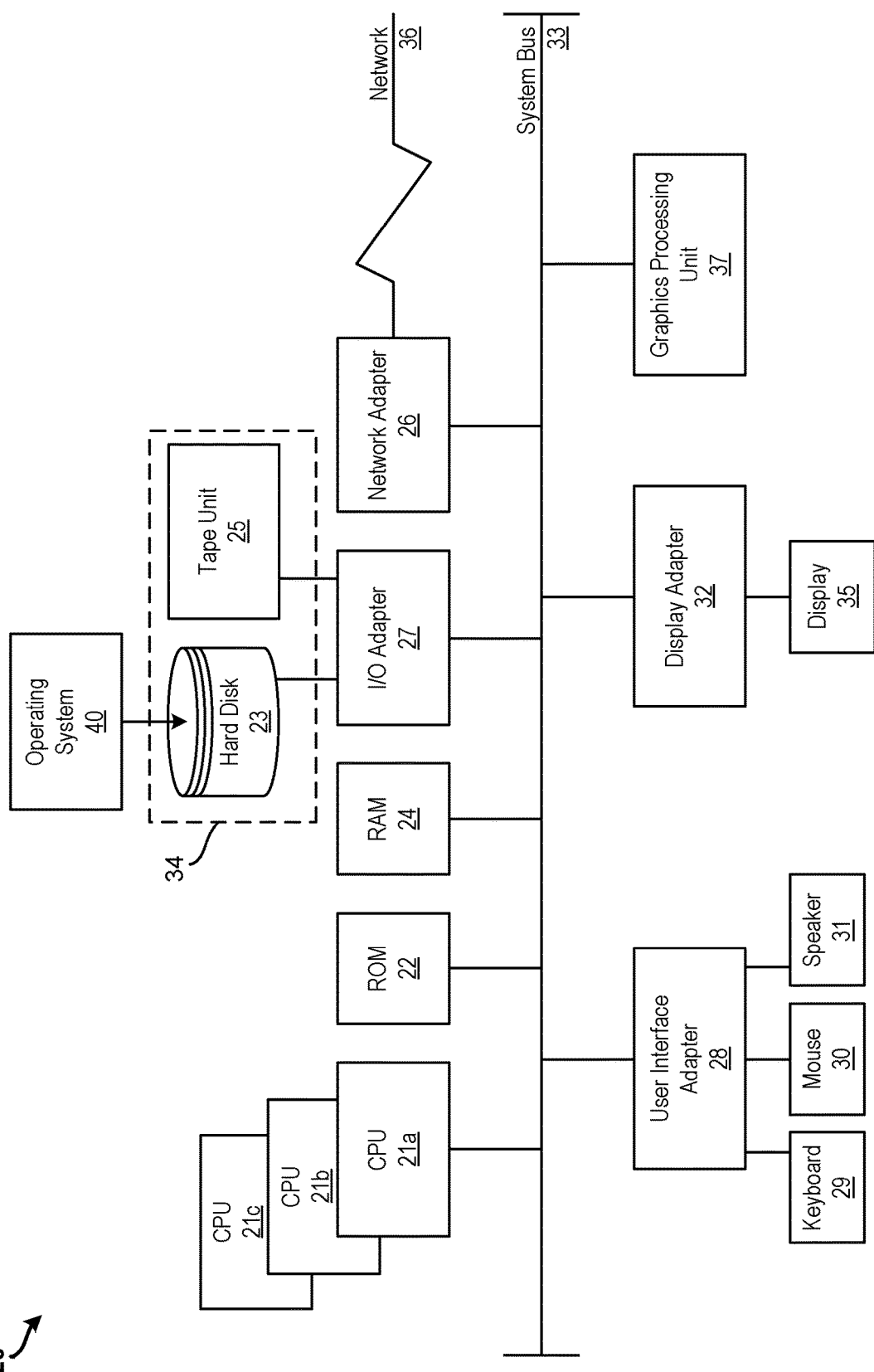
FIG. 5 illustrates a block diagram of a processing system for implementing the techniques described herein according to examples of the present disclosure.

The method 200 may be performed, for example, by the processing system 100 of FIGS. 1A and 1B, by the processing system 20 of FIG. 5, or by another suitable processing system. It should be appreciated that, although the method 200 is described with reference to field programmable devices, it should be appreciated that the FPDs may be one of a field-programmable gate array, a programmable read-only memory, or a programmable logic device. The method 200 is described below with reference to the elements of FIGS. 1A and 1B. The method 200 starts at block 202 and continues to block 204.

At block 204, the method 200 includes the dispatcher 112 receiving a next job (e.g., job A1 from the FPD job queue A of the virtual machine 120). At block 206, the FPD 110 processes the data indicated by a marker in the memory (e.g., memory 0-0xFF), and, at block 208, the FPD 110 writes an output result of the job to the memory.

In an embodiment, block 206 involves identifying a dispatchable unit of the job.

At decision block 210, the dispatcher 112 determines whether all data from the current job (e.g., job A1) is processed. If not, the current job is kept in the queue of the FPD 110 at block 212, and a marker for the tenant (e.g., the virtual machine 120 for FPD job queue A) is set for the current queue to the next memory address (a next dispatchable unit) at block 214. In some situations, the case may exist where processing one discrete piece of data takes a long period of time. In such a case, an interrupt may be used to interrupt the processing in the middle and support a context switch. If all data from the current job is determined to be processed at decision block 210, the method 200 includes removing the current job (A1) from the queue at block 216.

Once the marker for the current queue is set or once the current job is removed from the queue, the current cycle is complete at block 218. The method 200 continues to block 220 and ends. However, in some examples, the method 200 returns to the start at block 202 and the dispatcher 112 retrieves the next job in the FPD job queue.

Additional processes also may be included, and it should be understood that the processes depicted in FIG. 2 represent illustrations, and that other processes may be added or existing processes may be removed, modified, or rearranged without departing from the scope and spirit of the present disclosure.

Figure 3:
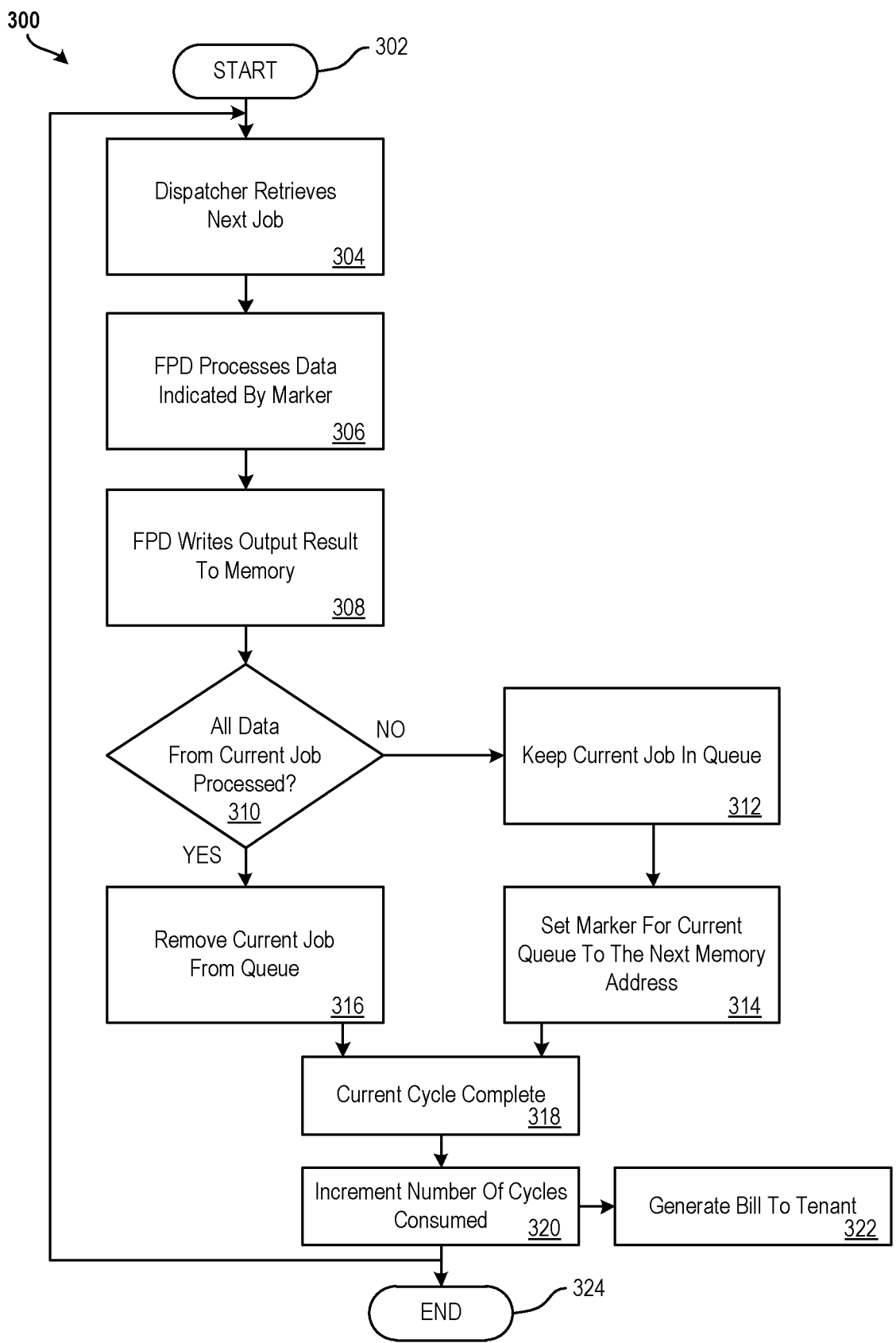
FIG. 3 illustrates a flow diagram of a method for resource sharing management of a field programmable device according to examples of the present disclosure.

In another example, the present techniques provide for tracking a number of cycles that a tenant has consumed. In particular, FIG. 3 illustrates a flow diagram of a method for resource sharing management of a field programmable device according to examples of the present disclosure.

The method 300 may be performed, for example, by the processing system 100 of FIGS. 1A and 1B, by the processing system 20 of FIG. 5, or by another suitable processing system. It should be appreciated that, although the method 300 is described with reference to field programmable devices, it should be appreciated that the FPDs may be one of a field-programmable gate array, a programmable read-only memory, or a programmable logic device. The method 300 is described below with reference to the elements of FIGS. 1A and 1B. The method 300 starts at block 302 and continues to block 304.

At block 304, the method 200 includes the dispatcher 112 receiving a next job (e.g., job A1 from the FPD job queue A of the virtual machine 120). At block 306, the FPD 110 processes the data indicated by a marker in the memory (e.g., memory 0-0xFF), and, at block 308, the FPD 110 writes an output result of the job to the memory.

At decision block 310, the dispatcher 112 determines whether all data from the current job (e.g., job A1) is processed. If not, the current job is kept in the queue of the FPD 110 at block 312, and a marker on the virtual machine (e.g., the virtual machine 120 for FPD job queue A) is set for the current queue to the next memory address at block 314. If, however, all data from the current job is determined to be processed at decision block 310, the method 300 includes removing the current job (A1) from the queue at block 316.

Once the marker for the current queue is set or once the current job is removed from the queue, the current cycle is complete at block 318, and a number of cycles consumed by the virtual machine (e.g., virtual machine 120) is incremented in a counter at block 320. The counter is used to track the number of cycles used/consumed by each of the virtual machines. This FPD usage information is then used to generate a bill to charge the tenant for the appropriate usage at block 322.

The method 300 continues to block 324 and ends. However, in some examples, the method 300 returns to the start at block 302 and the dispatcher 112 retrieves the next job in the FPD job queue.

In an example, block 320 can track other information for each tenant. For example, the queue time can be tracked, which is amount of time a job is waiting in a queue before it get processed. The cycle per job, which is the statistics related to the number of cycles required to process each job, can also be tracked. This can be the average, mean, medium, and/or standard deviation of number of cycle each job runs on the FPD. These statistics can be reported to the tenant, or compare against the SLA.

In an example, the information tracked for each tenant from multiple processing systems can be combined. For example, tenant X on processing system A is consuming 500 cycles of an FPD/s, and tenant X on processing system B is consuming 1000 cycles of an FPD/s. It can be reported that tenant X is consuming a total of 1500 cycles of FPD/s.

In an example, in a workload management context, if tenant X on processing system A is having a queue time of 5 seconds, average queue depth (number of job waiting to be processed) of 50, and using 100% of the apportioned FPD. Tenant X on processing system B is having a queue time of 0.01 seconds, average queue depth of 3, and using 10% of the apportioned FPD. The workload manager could instruct the load balancer to route more transactions for tenant X to processing system B instead or processing system A. Alternatively, the workload manager could instruct the processing system B to reduce the apportioned FPD for tenant X, while instruct the processing system A to increase the apportioned FPD for tenant X. With this change to the apportioned FPD, the FPD utilization by tenant X across all systems must satisfy the apportioned FPD utilization level for tenant X defined service level agreement (SLA).

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
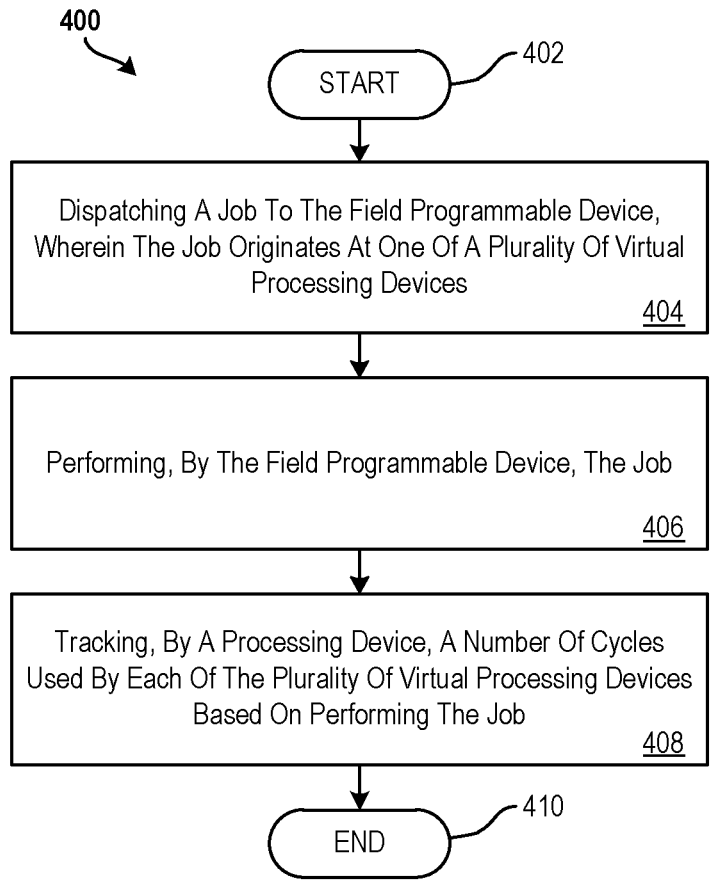
FIG. 4 illustrates a flow diagram of a method for resource sharing management of a field programmable device according to examples of the present disclosure.

FIG. 4 illustrates a flow diagram of a method for resource sharing management of a field programmable device according to examples of the present disclosure. The method 400 may be performed, for example, by the processing system 100 of FIGS. 1A and 1B, by the processing system 20 of FIG. 5, or by another suitable processing system. It should be appreciated that, although the method 400 is described with reference to field programmable devices, it should be appreciated that the FPDs may be one of a field-programmable gate array, a programmable read-only memory, or a programmable logic device. The method 400 is described below with reference to the elements of FIGS. 1A and 1B. The method 400 starts at block 402 and continues to block 404.

At block 404, the method 400 includes dispatching a job to the field programmable device, wherein the job originates at one of a plurality of virtual processing devices. The dispatching can be performed based on a service level agreement. For example, the FPD may be apportioned between different virtual processing devices (i.e., virtual machines) such that each virtual processing device has access to a certain amount of the FPD (e.g., a certain percentage of time). The dispatching can be performed by a firmware residing on the field programmable device, by a hardware device, in software of the processing system, or by other suitable methods. The job may be queued in and received from a field programmable device job queue on the one of the plurality of the virtual processing devices.

At block 406, the method 400 includes performing, by the field programmable device, the job.

At block 408, the method 400 includes tracking, by the processing device, a number of cycles used by each of the plurality of virtual processing devices based on performing the job. The method 400 continues to block 410 and ends.

Additional processes also may be included. For example, the method 400 may include tracking, by the processing device, a number of cycles used by each of the plurality of virtual processing devices. New jobs may also be dispatched and processed. It should be understood that the processes depicted in FIG. 3 represent illustrations, and that other processes may be added or existing processes may be removed, modified, or rearranged without departing from the scope and spirit of the present disclosure.

In another embodiment, the tenant and/or application job queue and any FPD processing statistics can be kept at the processing system level, hypervisor, virtual machine level, operating system level, application level, distributed memory in a distributed environment, or with each FPD. At each of these levels, the job queue and any FPD processing statistics can be kept in memory and/or periodically written to a storage device.

In an example, when the FPD queue is kept at the processing system level, the virtual machine 120 will submit a job to processing system 100 by calling an application programming interface (API) or system calls. Processing system 100 adds the job to a job queue within the memory owned by the processing system 100, and virtual machine 120 does not have access to the memory.

In an example, when the job queue is kept at some distributed memory, processing system A might be sharing the same job queue for tenant X with processing system B. Processing system A might processing a job on its FPD that was added to the queue by processing system B. The data to be processed by the FPD can be accessed by processing system A. For example, the data might be stored within the job queue. In another example, the data might be stored in a distributed storage or network database that both processing system A and processing system B have access to.

In another embodiment, the job queue and any FPD processing statistics can be migrated with the tenant or application. For example, when virtual machine X is migrating from processing system A to processing system B, the job queue and associated statistics kept at the processing system A are also migrated to processing system B.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed:

1. A computer-implemented method for resource sharing management of a field programmable device, the method comprising:
    applying resource control to the field programmable device such that a percentage of the field programmable device is apportioned to each virtual machine of a plurality of virtual machines, the percentage set proportional to a number of general processors assigned to each virtual machine;
    selecting a job belonging to one of a plurality of tenants based on the resource control, each virtual machine of the plurality of virtual machines representing a tenant of the plurality of tenants;
    dispatching a job to the field programmable device, wherein the job is received at a processing device, and wherein the job comprises dispatchable units;
    performing, by the field programmable device, the dispatchable units belonging to the job; and
    tracking, by the processing device, processing statistics related to each of the plurality of virtual processing devices based on performing the dispatchable units belong to the job.

2. The computer-implemented method of claim 1, wherein the processing statistics comprise a total number of cycles used by a tenant of the one of the plurality of tenants, a queue time of the job, and a number of cycles used by the job.

3. The computer-implemented method of claim 1, wherein the processing statistics from multiple processing devices are combined and used for at least one of workload management, reporting, and chargeback.

4. The computer-implemented method of claim 1, further comprising generating a bill for each of the plurality of processing devices based on number of cycles used by each of the plurality of virtual processing devices.

5. The computer-implemented method of claim 1, wherein the field programmable device is one of a field-programmable gate array, a programmable read-only memory, or a programmable logic device.

6. The computer-implemented method of claim 1, wherein the dispatching is performed by a firmware residing on the field programmable device.

7. The computer-implemented method of claim 1, wherein the job is queued in a field programmable device job queue.

8. The computer-implemented method of claim 1, further comprising dispatching a new job to the field programmable device, wherein the new job originates at another one of a plurality of virtual processing devices.

9. The computer-implemented method of claim 8, further comprising performing, by the field programmable device, the new job.

10. The computer-implemented method of claim 9, further comprising tracking, by a processing device, the number of cycles used by each of the plurality of virtual processing devices based on performing the new job.

11. The computer-implemented method of claim 1, further comprising the tracking of a next dispatchable unit of a job, and processing the next dispatchable unit in the field programmable device when the job is selected.

12. The method of claim 1, wherein a sum of the percentages for all of the virtual machines is less than one hundred percent.

13. A system for resource sharing management of a field programmable device, the system comprising:
    a memory having computer readable instructions; and
    a processing device for executing the computer readable instructions, the computer readable instructions comprising:
        applying resource control to the field programmable device such that a percentage of the field programmable device is apportioned to each virtual machine of a plurality of virtual machines, the percentage set proportional to a number of general processors assigned to each virtual machine;
        selecting a job belonging to one of a plurality of tenants based on the resource control, each virtual machine of the plurality of virtual machines representing a tenant of the plurality of tenants;
        dispatching a job to the field programmable device, wherein the job is received at a processing device, and wherein the job comprises dispatchable units;
        performing the dispatchable units belonging to the job using the field programmable device; and
        tracking processing statistics related to each of the plurality of virtual processing devices based on performing the dispatchable units belong to the job.

14. The system of claim 13, wherein the processing statistics comprise a total number of cycles used by a tenant of the one of the plurality of tenants, a queue time of the job, and a number of cycles used by the job.

15. The system of claim 13, wherein the processing statistics from multiple processing devices are combined and used for at least one of workload management, reporting, and chargeback.

16. The system of claim 13, the computer readable instructions further comprising generating a bill for each of the plurality of processing devices based on number of cycles used by each of the plurality of virtual processing devices.

17. The system method of claim 13, wherein the field programmable device is one of a field-programmable gate array, a programmable read-only memory, or a programmable logic device.

18. The system of claim 13, wherein the dispatching is performed by a firmware residing on the field programmable device.

19. The system of claim 13, wherein a sum of the percentages for all of the virtual machines is less than one hundred percent.

20. A computer program product for resource sharing management of a field programmable device, the computer program product comprising:

a computer readable storage medium having program instructions embodied therewith, the program instructions executable by a processing device to cause the processing device to:

apply resource control to the field programmable device such that a percentage of the field programmable device is apportioned to each virtual machine of a plurality of virtual machines, the percentage set proportional to a number of general processors assigned to each virtual machine;

select a job belonging to one of a plurality of tenants based on the resource control, each virtual machine of the plurality of virtual machines representing a tenant of the plurality of tenants;

dispatch a job to the field programmable device, wherein the job is received at a processing device, and wherein the job comprises dispatchable units;

perform the dispatchable units belonging to the job using the field programmable device; and track processing statistics related to each of the plurality of virtual processing devices based on performing the dispatchable units belong to the job.

* * * * *